United States Patent Office 3,459,755
Patented Aug. 5, 1969

3,459,755
PROCESS OF PRODUCING 2-LOWER ALKYL-5,6,7 OR 8-HYDROXY DECAHYDROISOQUINOLINES
Ian William Mathison and Richard Charles Gueldner, Memphis, Tenn., assignors to Marion Laboratories, Inc., Kansas City, Mo., a corporation of Delaware
No Drawing. Filed May 8, 1967, Ser. No. 636,611
Int. Cl. C07d 35/04
U.S. Cl. 260—289                                    9 Claims

ABSTRACT OF THE DISCLOSURE

Disclosed is a process of hydrogenating 2-lower alkyl-5,6,7- or 8-nitroisoquinolinium salts to form 2-lower alkyl - 5,6,7- or 8-aminodecahydroisoquinolines and converting such compounds to 2-lower alkyl-5,6,7- or 8-hydroxydecahydroisoquinolines.

This invention relates to isoquinoline derivatives. More particularly, this invention is concerned with a process of producing 2-lower alkyl - 5,6,7- or 8 - hydroxydecahydroisoquinolines and intermediates useful in such process.

The chemical literature discloses processes of producing 2 - lower alkyl - 5,6,7- or 8 - hydroxydecahydroisoquinolines. See, for example, the Journal of Organic Chemistry, 27, 4571 (1962). The processes disclosed in the literature, however, are not particularly suitable for producing these compounds in large amounts because the yields are low, the processes involved and the reactants expensive. Improved processes of producing 2-lower alkyl - 5,6,7- or 8 - hydroxydecahydroisoquinolines are needed because these compounds are important intermediates in forming other valuable compounds. For example, 5 - (3,4,5 - trimethoxybenzoyloxy) - 2 - ethyl-decahydroisoquinoline has antiarrhythmic activity in animals when administered orally as is disclosed in co-pending application Ser. No. 564,001, filed July 11, 1966. This compound, as the HBr salt administered to dogs as a dosage of 2 mg./kg. intravenously over a two minute period slowed ventricular rate and decreased ectopic ventricular rate to the same extent as 10 mg./kg. of quinidine sulfate, a drug widely used for abnormal rhythm of the heart. The compound can be administered as a unit dosage form containing about 0.02 to 500 mg. of active agent although 20 mg. is the highest amount considered needed in unit dosage forms, such as tablets and capsules.

Also, United States Patent No. 3,317,541 discloses 2-lower alkyl-7-hydroxy decahydroisoquinolines and the production of benzoyloxy derivatives thereof useful for lowering blood pressure.

There is accordingly provided by the subject invention the process of producing 2-lower alkyl - 5,6,7- or 8-hydroxydecahydroisoquinolines which comprises catalytically reducing a 2 - lower alkyl - 5,6,7- or 8 - nitro-isoquinolinium salt to produce a 2-lower alkyl - 5,6,7- or 8 - aminodecahydroisoquinoline, diazotizing said compound with nitrous acid to produce a 2-lower alkyl-5,6,7- or 8 - diazonium decahydroisoquinoline salt and decomposing the salt by hydrolysis to produce 2-lower alkyl - 5,6,7- or 8 - hydroxydecahydroisoquinoline. This process can be represented as follows:

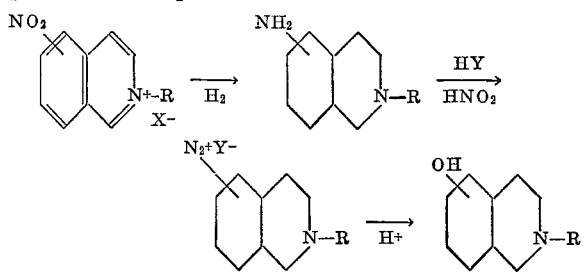

wherein R represents a lower alkyl such as methyl, ethyl and propyl, X represents an anion such as the chloride, bromide, iodide, sulfate and p-toluenesulfonate ions and Y represents an anion such as the chloride, sulfate, phosphate and sulfonate ions.

Chem. Pharm. Bull (Japan) 6, 497–500 (1958) discloses the 5,6 and 7-nitro isoquinolines and the 8-nitro compound is disclosed in Elderfield "Heterocyclic Compounds" vol. IV, p. 410–411 (1952).

The 2-lower alkyl nitroisoquinolinium salts used as starting materials are readily obtained by quaternizing a 5,6,7- or 8 - nitroisoquinoline with an appropriate alkylating agent such as an alkyl halide, alkyl sulfate or alkyl p-toluenesulfonate. Conventional procedures and conditions for the quaternizing can be used. Among the starting materials which can be used in the process of this invention are 2 - methyl - 5 - nitroisoquinolinium chloride, 2 - ethyl - 5 - nitroisoquinolinium iodide, 2-methyl-5 - nitroisoquinolinium sulfate, 2 - propyl 7 - nitro-isoquinolinium iodide and 2-methyl - 5 - nitroisoquino-linium p-toluenesulfonate.

In the first step of the process of this invention, the 2-lower alkyl - 5,6,7- or 8 - nitroisoquinolinium salt is catalytically hydrogenated directly to a 2-lower alkyl-5,6,7- or 8 - aminodecahydroisoquinoline. The hydrogenation can be readily effected by use of a platinum oxide catalyst, glacial acetic acid as the hydrogenation medium together with a small amount of a strong acid, and particularly sulfuric acid, and a hydrogen pressure of about 25 to 100 p.s.i. The hydrogenation proceeds at room temperature with the evolution of heat. The hydrogenation is substantially complete in about 48–100 hours. After filtering to remove the catalyst, and evaporating off most of the acetic acid from the filtrate, the residue can be made alkaline and the free base extracted with ether. Evaporation of ether yields the liquid 2-lower alkyl-5,6,7- or 8-aminodecahydroisoquinoline.

Among the 2-lower alkyl-5,6,7- or 8-aminodecahydro-isoquinolines which are produced by the described process are:

2-methyl-5-aminodecahydroisoquinoline,
2-ethyl-5-aminodecahydroisoquinoline and
2-propyl-7-aminodecahydroisoquinoline.

These and other compounds so produced are readily converted to acid addition salts and quaternary ammonium salts as desired. Some of the salts which can be readily produced are the hydrochloride, hydrobromide, sulfate, p-toluenesulfonate, methyliodide and ethylchloride salts of these compounds.

In the next step of the process, the 2-lower alkyl-5,6,7- or 8-aminodecahydroisoquinoline is converted to a 2-lower alkyl-5,6,7- or 8-hydroxydecahydroisoquinoline. In this step the 2-lower alkyl-5,6,7- or 8-aminodecahydroisoquinoline is first converted to a diazonium salt and the salt then decomposed to form the desired 2-lower alkyl-5,6,7- or 8-hydroxydecahydroisoquinoline.

Conversion of the 2-lower alkyl-5,6,7- or 8-aminodecahydroisoquinoline to the diazonium salt can be readily achieved by contacting the amino compound, as the free base or an acid addition salt, with nitrous acid in the presence of an excess of a strong mineral acid such as sulfuric acid or hydrochloric acid under aqueous reaction conditions. The needed nitrous acid can be formed in situ by adding an alkali metal nitrite, such as sodium nitrite, to water so that upon being brought into contact with the mineral acid, nitrous acid is formed. The diazonium salt forms readily at room temperature or below such as in an ice bath. The intermediate diazonium salt is generally not isolated since it is very unstable and begins to decompose immediately with release of nitrogen and other gases. Instead of isolating the diazonium salt, its decomposition can be further enhanced by moderately heating the reaction mixture until gas evolution has substantially ceased. After the reaction is terminated, the reaction mixture is advisably made alkaline, such as with aqueous sodium hydroxide; extracted with ether and the ether evaporated. The product can be further purified by fractional distillation under reduced pressure.

Among the compounds which can be produced from the amine precursors are:

2-methyl-5-hydroxydecahydroisoquinoline,
2-ethyl-5-hydroxydecahydroisoquinoline,
2-propyl-7-hydroxydecahydroisoquinoline and
2-methyl-7-hydroxydecahydroisoquinoline.

The following examples are presented to illustrate, but not limit, the invention.

EXAMPLE 1

N-methyl-5-nitroisoquinolinium-p-toluenesulfonate and N-ethyl-5-nitroisoquinolinium bromide Methyl-p-toluenesulfonate (26.8 g.), and 25.0 g. of 5-nitroisoquinoline (M.P. 106–109° C.) were mixed in 80 ml. of dimethyl formamide and heated to about 40° C. to dissolve the 5-nitroisoquinoline. After allowing the mixture to stand for 7 hours at room temperature, it was seeded and allowed to stand for a further two days. The dimethyl formamide was decanted and the crystalline cake washed with ethyl acetate. After drying at 60° C. for 2 hours, the material from the cake weighed 34.7 g., M.P. 140.0–142.5° C. The ethyl acetate washings were added to the dimethyl formamide decantate to precipitate 11.8 g. of product, M.P. 135.0–138.5° C. when dry. Recrystallization of the combined crops from 75 ml. of hot absolute ethanol and 200 ml. of hot ethyl acetate yielded 39–40 g. (75–77% yield), M.P. 143–144° C.

Refluxing 5-nitroisoquinoline with ethyl bromide for 25 hours produced a 66% yield of the quaternary salt, melting point 233–234° C. Using dimethyl formamide as solvent, a similar reaction was complete in about 24 hours with no heating.

EXAMPLE 2

N-methyl-5-aminodecahydroisoquinoline

Twenty-five grams of N-methyl-5-nitroisoquinolinium-p-toluenesulfonate was dissolved in 150 ml. of glacial acetic acid, 0.6 ml. concentrated sulfuric acid was added and the mixture hydrogenated over 4 g. of platinum oxide catalyst at 50 p.s.i. Reduction to the tetrahydro stage was very fast (25 mins.) and was accompanied by a sudden color change from yellow-brown to colorless. Much heat was produced with a rise in temperature of the reaction mixture from room temperature to 60–80° C. At the point of rapid color change, the pressure drop was 28.5 lbs. and the rate of hydrogen uptake dropped markedly. After 120 hours the pressure drop was 48.0 lbs. After removal, in vacuo, of most of the acetic acid, the residue was made alkaline with aqueous sodium hydroxide and the N - methyl-5-amino-decahydroisoquinoline extracted with ether. When dried and concentrated, a total yield of 95% was obtained which consisted of about 60% of a mixture of cis- and trans-N-methyl-5-aminodecahydroisoquinoline and the remainder other products. Distillation of the mixture of cis- and trans-N-methyl-5-aminodecahydroisoquinoline showed it boiled at 55° C. at 0.1 mm. Hg.

The recovered catalyst can be reused three or more times with only slightly diminished activity if it is washed well with water after using each time.

EXAMPLE 3

2-methyl-5-hydroxydecahydroisoquinoline

The crude reaction product (10.9 g.) containing 2-methyl-5-aminodecahydroisoquinoline obtained directly from a hydrogenation according to Example 2, after removal of catalyst and most of the acetic acid, was mixed with 7.2 g. of concentrated sulfuric acid in 50 ml. of water. To this mixture was added at one time 5.5 g. of sodium nitrite (theoretical amount 5.2 g.) in 56 ml. of water. The nitrogen evolved was collected over water as the reaction proceeded.

| Time (min.): | Mls. $N_2$ (Containing oxides of nitrogen) |
| --- | --- |
| 6 | 610 |
| 12 | 745 |
| 19 | 810 |
| Total (3–4 hrs.) | 2165 |

More $H_2SO_4$ and $NaNO_2$ were added after two hours. When the reaction slowed again the mixture was heated until the evolution of gas ceased. The reaction mixture was cooled in an ice bath and made alkaline with 20% sodium hydroxide solution. The aqueous solution was extracted 6 times with ether (vigorous shaking only after the first extraction since the first extraction will form a stable emulsion). The recovery of material on a weight basis was 90–95%.

In a distillation of 21.4 g. of the product from three such reactions the following fractions were obtained:

| Fraction | B.P., °C | Press. (mm.) | Weight, (g.) | Composition |
| --- | --- | --- | --- | --- |
| 1 | 40–45, 45–70 | 0.23, 0.15 | 6.67 | 10–20% olefins and 80–90% unreacted amines. |
| 2 | 70–75 | 0.15 | 1.94 | Amines and alchols. |
| 3 | 75–77 | 0.15 | 4.95 | Desired alcohol partially crystalline. |
| 4 | 77–90 superheating. | 0.15 | 3.45 | Do. |
| 5 | Residue | | 1.09 | |
| Total | | | 18.10 | |

Further purification of fractions 3 and 4 was achieved by separately slurrying each fraction with ⅓ to ½ its volume of pentane. The crystals that formed were filtered, combined and recrystallized from a minimum amount of benzene. This raised the melting point from 87.5–90° C. to 93–94° C., yield 0.7 g. (from 1.4 g.). Column chromatography (alumina-chloroform) of the separate pentane slurry filtrates yielded 1.5 g. (combined total) of crude solid alcohol. About 80% of this crude alcohol came from fraction 3. Recrystallization of pentane of the 2-methyl-5-hydroxydecahydroisoquinoline from the column chromatography yielded 0.7 g., M.P. 93–94° C. Additional yields of the desired 2 - methyl-5-hydroxydecahydroisoquinoline could have been obtained from the various mother liquors.

If the 2-methyl-5-aminodecahydroisoquinoline from Example 2 is used in the form of a salt, such as the p-toluenesulfonate, for diazotization, a good yield of the desired alcohol is obtained but a small amount of the acetate ester may be formed depending on the extent to which the acetic acid has been removed.

What is claimed is:

1. The process which comprises catalytically hydrogenating a compound of the formula

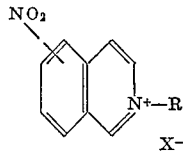

in glacial acetic acid with a platinum oxide catalyst to produce a compound of the formula

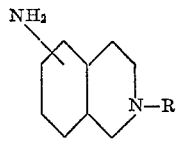

converting said compound with nitrous acid and an anion supplying acid to a diazonium salt and decomposing the diazonium salt to form a compound of the formula

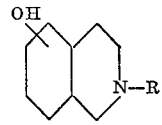

wherein R is lower alkyl and X is an anion other than a hydroxyl anion and wherein the converted group maintains the same position on the ring.

2. The process of claim 1 in which the anion supplying acid is a mineral acid.

3. The process which comprises catalytically hydrogenating a 2-lower alkyl-5-nitroisoquinolinium-p-toluenesulfonate in glacial acetic acid with platinum oxide to produce a 2-lower alkyl-5-aminodecahydroisoquinoline, converting said compound with nitrous acid and an anion supplying acid to a diazonium salt and decomposing the diazonium salt to form a 2-lower alkyl-5-hydroxydecahydroisoquinoline.

4. The process of claim 3 in which the anion-supplying acid is a mineral acid.

5. The process of claim 3 in which the 2-lower alkyl is 2-methyl or 2-ethyl.

6. The process which comprises catalytically hydrogenating a compound of the formula

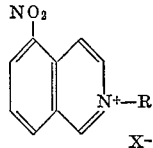

in glacial acetic acid with a platinum oxide catalyst to produce a compound of the formula

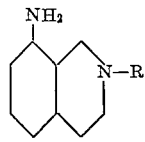

converting said compound with nitrous acid and an anion-supplying acid to a diazonium salt and decomposing the diazonium salt to form a compound of the formula

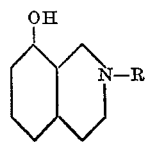

wherein R is lower alkyl and X is an anion other than a hydroxyl anion.

7. The process which comprises catalytically hydrogenating a compound of the formula

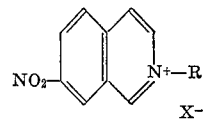

in glacial acetic acid with a platinum oxide catalyst to produce a compound of the formula

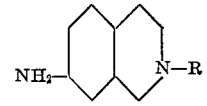

converting said compound with nitrous acid and an anion supplying acid to a diazonium salt and decomposing the diazonium salt in form a compound of the formula

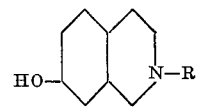

wherein R is lower alkyl and X is an anion other than a hydroxyl anion.

8. The process which comprises catalytically hydrogenating a compound of the formula

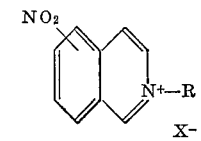

in glacial acetic acid with a platinum oxide catalyst to produce a compound of the formula

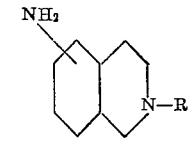

9. The process of claim 8 in which the $NO_2$, $NH_2$ and OH groups are on the 5-position of the ring.

References Cited

UNITED STATES PATENTS

| | | | |
|---|---|---|---|
| 3,317,541 | 5/1967 | Umezawa et al. | 260—289 X |
| 3,379,730 | 4/1968 | Mathison | 260—286 |
| 3,015,661 | 1/1962 | Georgian | 260—289 X |
| 3,317,541 | 5/1967 | Umezawa et al. | 260—289 X |

OTHER REFERENCES

Kimoto et al., Chem. Pharm. Bull. (Japan), vol. 9, pp. 480–84 (1961).

Elder Field, "Heterocyclic Compounds, vol. IV," pp. 410–11 (1952).

Fuson et al., "Organic Chemistry," Wiley, pp. 114–5, 118–9 (1942).

ALEX MAZEL, Primary Examiner

D. G. DAUS, Assistant Examiner

U.S. Cl. X.R.

260—283, 286, 288, 689; 424—258

PO-1050
(5/69)

UNITED STATES PATENT OFFICE
CERTIFICATE OF CORRECTION

Patent No. 3,459,755          Dated August 5, 1969

Inventor(s) Ian William Mathison & Richard Charles Gueldner

It is certified that error appears in the above-identified patent and that said Letters Patent are hereby corrected as shown below:

Column 4, line 36, change "2165" to read -- 1565 --. Column 5, line 60, the formula should be:

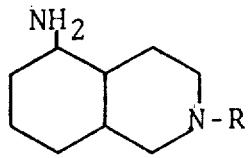

line 70, the formula should be:

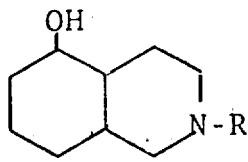

Column 6, line 47, (before claim 9) insert -- converting said compound with nitrous acid and an anion supplying mineral acid to a diazonium salt and decomposing the diazonium salt to form a compound of the formula

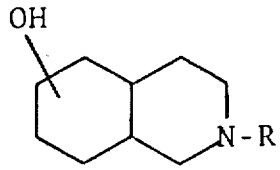

wherein R is methyl or ethyl and X is p-toluenesulfonate, chlorine bromine, iodine or sulfate, and wherein the converted group maintains the same position on the ring. --. Column 6, line 57, delete this line since the Umezawa reference is also listed in line 54.

SIGNED AND
SEALED
MAR 31 1970

(SEAL)
Attest:

Edward M. Fletcher, Jr.
Attesting Officer

WILLIAM E. SCHUYLER, JR.
Commissioner of Patents